United States Patent
Suzuki

(10) Patent No.: US 10,245,932 B1
(45) Date of Patent: Apr. 2, 2019

(54) VEHICLE FRONT STRUCTURE AND VEHICLE BRACKET

(71) Applicant: TOYOTA JIDOSHA KABUSHIKI KAISHA, Toyota-shi, Aichi-ken (JP)

(72) Inventor: Eiji Suzuki, Owariasahi (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/126,074

(22) Filed: Sep. 10, 2018

(30) Foreign Application Priority Data

Sep. 19, 2017 (JP) .................... 2017-179212

(51) Int. Cl.
| | |
|---|---|
| *B62D 21/15* | (2006.01) |
| *B60K 1/00* | (2006.01) |
| *H02K 5/26* | (2006.01) |
| *B62D 21/02* | (2006.01) |

(52) U.S. Cl.
CPC .............. *B60K 1/00* (2013.01); *B62D 21/02* (2013.01); *B62D 21/152* (2013.01); *H02K 5/26* (2013.01)

(58) Field of Classification Search
CPC ...................................................... B62D 21/15
See application file for complete search history.

(56) References Cited

U.S. PATENT DOCUMENTS

| | | | |
|---|---|---|---|
| 9,630,486 B2* | 4/2017 | Yamada | B60K 28/14 |
| 10,093,183 B2* | 10/2018 | Murata | B60K 1/04 |
| 2013/0119704 A1* | 5/2013 | Amano | B60K 1/00 |
| | | | 296/187.1 |

FOREIGN PATENT DOCUMENTS

JP          2011-20627 A    2/2011

* cited by examiner

*Primary Examiner* — James A Shriver, II
*Assistant Examiner* — James J Triggs
(74) *Attorney, Agent, or Firm* — Oliff PLC

(57) ABSTRACT

The bracket includes a front fastening portion, a rear fastening portion, and a connecting portion which connects the two of them. The front fastening portion and the rear fastening portion are brought into contact with the upper surface of the Fr side member and protrude inward in the vehicle width direction from the upper surface of the Fr side member to come into contact with the upper surface of the MGCpm cross member. Further, the front fastening portion and the rear fastening portion are provided so as to be arranged in pairs in the front-rear direction across the bending and buckling starting point of the Fr side member. The connecting portion is formed in an angular groove shape having a front wall portion, a rear wall portion, and a side wall portion and recessed in the vehicle width direction in a cross-section in a plan view.

5 Claims, 11 Drawing Sheets

VEHICLE FRONT STRUCTURE AND VEHICLE BRACKET

PRIORITY INFORMATION

This application claims priority to Japanese Patent Application No. 2017-179212, filed on Sep. 19, 2017, which is incorporated herein by reference in its entirety.

TECHNICAL FIELD

The present disclosure relates to a vehicle front structure and a vehicle bracket.

BACKGROUND

For example, as described in JP 2011-20627A, a motor compartment (hereinafter appropriately referred to as MG compartment), in which a rotary electric machine serving as a driving source is mounted, is provided in a front part of an electric vehicle.

In the MG compartment, the rotary electric machine is mounted on a framework member of the vehicle. Specifically, in the MG compartment, a pair of front side members (hereinafter appropriately referred to as Fr side members) extend as framework members along a front-rear direction of the vehicle. Further, a motor compartment cross member (hereinafter appropriately referred to as an MGCpm cross member) is provided to extend over the pair of Fr side members. A rotary electric machine (driving equipment) is mounted on the MGCpm cross member.

The MGCpm cross member is fixed to the Fr side member via the bracket. For example, the bracket is fastened to an upper surface of the Fr side member. Further, a part of the bracket protrudes inward in a vehicle width direction from the Fr side member, and bolt holes are also provided in the protruding portion. In an assembling process of the vehicle, the MGCpm cross member equipped with the rotary electric machine is pushed up from the bottom to a body in a lifted state, and a widthwise end portion of the MGCpm cross member and the protruding portion of the bracket are fastened with bolts.

SUMMARY

Meanwhile, the Fr side member adopts a structure that absorbs an impact at the time of a front surface collision (hereinafter referred to as "front collision" as appropriate) by buckling deformation. For example, as illustrated in FIG. 10, bending and buckling starting points 102A, 102B, and 102C are provided in the Fr side member 100. For example, a plate material constituting the Fr side member 100 is provided with a bead 103 from which a part of the plate material is embossed for improving the surface pressure rigidity. For example, when the bead 103 is formed intermittently along a longitudinal direction of the plate material, a portion having a relatively low surface pressure rigidity between the adjacent beads 103, 103 is the bending and buckling starting point 102. As illustrated in FIG. 10, when the bending and buckling starting points 102A to 102C are provided on the side surface of the Fr side member 100, the Fr side member 100 mainly bends inward and outward in the vehicle width direction at the time of collision.

Depending on the fastened state of the bracket the Fr side member, the buckling deformation of the Fr side member may be hindered in some cases. For example, as illustrated in FIG. 11, in a case where a pair of fastening portions 104A and 104B are provided with a bending and buckling starting point 102A interposed therebetween, when the Fr side member 100 is bent and buckled, the bracket 106 is stretched to hinder bending and buckling.

For example, in the case of FIG. 11, the Fr side member 100 is bent and buckled such that the valley folds around the bending and buckling starting point 102A. At this time, a distance D1 between the fastening portions 104A and 104B increases. When the distance D1 increases, a tensile load is applied to the plate material between the fastening portions 104A and 104B of a bracket 106, and a tensile stress is generated in the plate material accordingly. This tensile stress may hinder the bending and buckling of the Fr side member 100.

Accordingly, an object of the disclosure is to provide a vehicle bracket that is attached to an Fr side member and is able to suppress interference of the Fr side member to the bending and buckling deformation, and a vehicle front structure including the same.

Solution to Problem

The disclosure relates to a vehicle front structure. The structure includes a pair of Fr side members, a support frame, and a bracket. The pair of Fr side members extend in a front-rear direction of the vehicle. The support frame is provided between the pair of Fr side members, and is equipped with a rotary electric machine serving as a driving source. The bracket fixes the support frame to the pair of Fr side members. A bending and buckling starting point in a vehicle width direction is formed in the Fr side member. The bracket is provided with a fastening portion which comes into contact with an upper surface of the Fr side member, protrudes inward in the vehicle width direction from the upper surface of the Fr side member, and comes into contact with the upper surface of the support frame so as to be disposed in a pair in a front-rear direction across a buckling starting point of the Fr side member. Further, the bracket includes a connecting portion having an angular groove shape recessed in the vehicle width direction in a cross-section in a plan view, the connecting portion including a front wall portion connected to a front fastening portion among the pair of fastening portions and extending in a height direction, a rear wall portion connected to a rear fastening portion among the pair of fastening portions and extending in the height direction, and a side wall portion which connects the front wall portion and the rear wall portion.

According to the above disclosure, the connecting portion has an angular groove shape (so-called U shape) recessed in the vehicle width direction in a cross-section in a plan view, and is bending-deformable with respect to the load input in the front-rear direction of the vehicle. Therefore, for example, when the Fr side member is bent and buckled, the distance between the pair of fastening portions is changed, but at that time, the connecting portion is bent and deformed with respect to the load in the front-rear direction of the vehicle which is input to the bracket. By the bending deformation, it is possible to change the distance between the fastening portions, and as a result, interference of the Fr side member to the bending and buckling is suppressed.

In the above disclosure, the connecting portion may extend in the height direction along a shape of an inner wall surface of a fender apron, and a closed cross-section structure may be formed by the fender apron, the front wall portion, the side wall portion, and the rear wall portion.

By forming the closed cross-section structure extending in the height direction, the support rigidity of the bracket in the up-down direction with respect to the support frame is improved as compared with the open cross-section structure.

Further, in the above disclosure, the support frame may include a front arm fastened to a front fastening portion among the pair of fastening portions, a rear arm fastened to a rear fastening portion among the pair of fastening portions, and a connecting arm which connects the front arm and the rear arm. In this case, the connecting arm may be provided so as to be spaced apart inward in the vehicle width direction from the bracket.

By adopting a structure in which the connecting arm is spaced inward in the vehicle width direction from the bracket, a space is generated inside the Fr side member in the vehicle width direction. When the Fr side member is bent and buckled inward in the vehicle width direction from the bending and buckling starting point, the Fr side member can enter the space, thereby avoiding the contact between the Fr side member and the support frame.

Further, another aspect of the disclosure is related to a vehicle bracket in which a support frame provided between a pair of Fr side members and equipped with a rotary electrical machine serving as a driving source is fixed to the pair of Fr side members extending in a front-rear direction of the vehicle. A bending and buckling starting point in a vehicle width direction is formed in the Fr side member. The vehicle bracket includes a fastening portion and a connecting portion. The fastening portion is brought into contact with an upper surface of the Fr side member, protrudes inward in the vehicle width direction from the upper surface of the Fr side member, comes into contact with the upper surface of the support frame, and is disposed in a pair in a front-rear direction across the bending and buckling starting point of the Fr side member. The connecting portion has an angular groove shape recessed in the vehicle width direction in a cross-section in a plan view which includes a front wall portion connected to a front fastening portion among the pair of fastening portions and extending in a height direction, a rear wall portion connected to a rear fastening portion among the pair of fastening portions and extending in the height direction, and a side wall portion which connects the front wall portion and the rear wall portion.

Advantageous Effects of Invention

According to the disclosure, it is possible to suppress the interference of the bracket attached to the Fr side member to the bending and buckling of the Fr side member.

BRIEF DESCRIPTION OF DRAWINGS

The present invention will be further described with reference to the accompanying drawings, wherein like reference numerals refer to like parts in the several views, and wherein.

DESCRIPTION OF EMBODIMENTS

Figure 1:
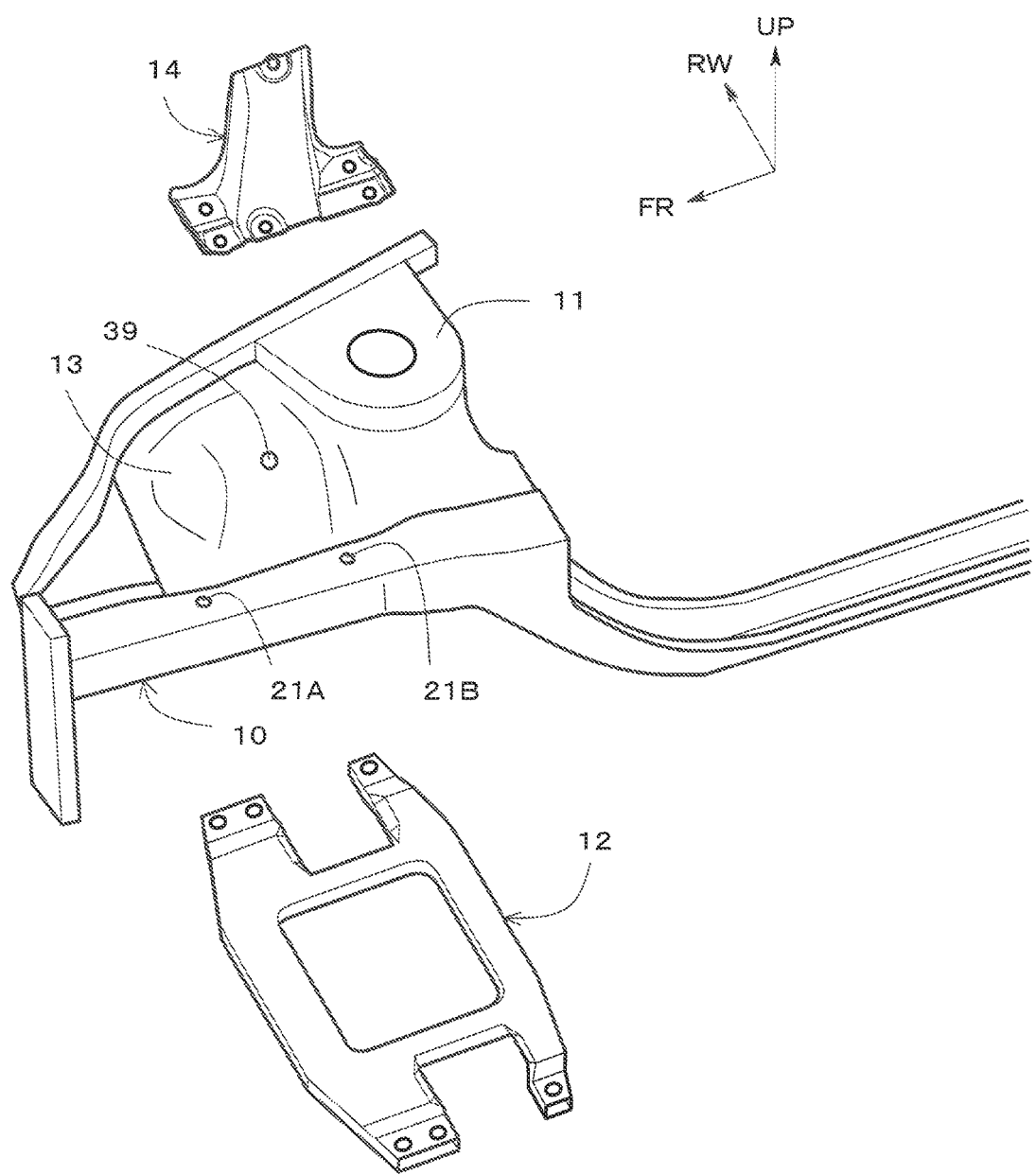
FIG. 1 is an exploded perspective view illustrating respective members which constitute a vehicle front structure according to an embodiment of the invention.

In FIG. 1, each member constituting the vehicle front structure according to the embodiment is illustrated. In FIGS. 1 to 11, a front-rear direction of the vehicle is indicated by an axis represented by a symbol FR, a vehicle width direction is indicated by an axis represented by a symbol RW, and a vertical direction is indicated by an axis represented by a symbol UP. Symbol FR is an abbreviation of Front, and in the front-rear direction axis FR, the forward direction of the vehicle is defined as a positive direction. Symbol RW is an abbreviation of Right Width, and in the width direction axis RW, a right width direction is defined a positive direction. The upward direction of the height axis UP is defined as a positive direction.

As illustrated in FIG. 1, the FR axis, RW axis, and UP axis are orthogonal to each other. Hereinafter, when describing the vehicle front structure according to the embodiment, these three axes will be mainly described as appropriate. For example, a "front end" refers to an end portion on a FR axis positive direction side of an arbitrary member, and a "rear end" refers to an end portion on a FR axis negative direction side of an arbitrary member. An "inner side in the width direction" refers to a relatively inner side in the width direction of the vehicle along the RW axis, and an "outer side in the width direction" refers to a relatively outer side in the width direction of the vehicle along the RW axis. Further, an "upper side" refers to a relatively positive direction side of the UP axis, and a "lower side" refers to a relatively negative direction side of the UP axis.

The vehicle front structure according to the embodiment includes an Fr side member 10, an MGCpm cross member 12 which constitutes a support frame, and a bracket 14. These members are installed in the MG compartment of the vehicle front part. As will be described later, the MGCpm cross member 12 is fixed to the Fr side member 10 via the bracket 14. The vehicle front structure according to the embodiment is mounted on, for example, an electric vehicle (EV).

Although a pair of Fr side members 10 is provided in the MG compartment, only one Fr side member 10 is illustrated in FIGS. 1 to 9, in view the symmetry of the vehicle structure. The other Fr side member (not illustrated) 10 also has a structure similar to that of the illustrated Fr side member 10.

In addition to the illustrated Fr side member 10, the MGCpm cross member 12, and the bracket 14, the MG compartment is provided with so-called high-power equipment (high-voltage equipment) such as a rotary electric machine serving as a driving source, and a DC/DC converter or an inverter for supplying electric power from the battery to the rotary electric machine. However, in FIGS. 1 to 9, the vehicle front structure including the bracket 14 according to the embodiment will not be described, for the convenience of explanation.

Figure 2:
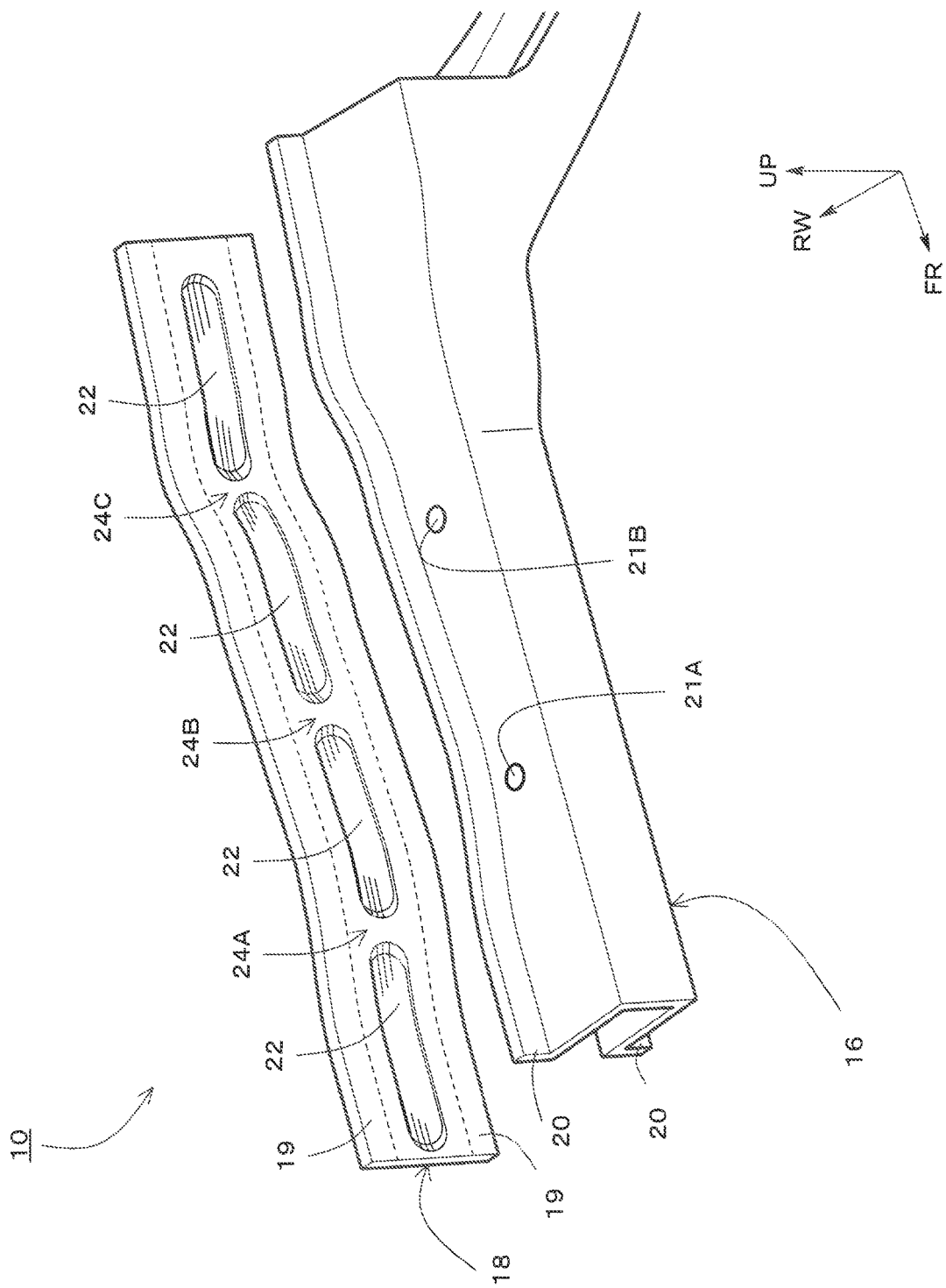
FIG. 2 is an exploded perspective view illustrating respective members which constitute the Fr side member.

The Fr side member 10 is a pair of framework members extending in the front-rear direction of the vehicle. FIG. 2 illustrates an exploded perspective view of the Fr side member 10. Further, although the Fr side member 10 is configured to include a front linear portion and a kick portion curved downward from the rear end thereof, the front linear portion is mainly illustrated in FIG. 2.

The Fr side member 10 is provided on both sides of the vehicle. As illustrated in FIG. 1, a suspension tower 11 and a fender apron 13 are connected to the outer side in the width direction of the Fr side member 10.

The Fr side member 10 is configured to include an inner panel 16 and an outer panel 18. The inner panel 16 is an inner member in the width direction of the Fr side member 10, and is configured to have a hat shape in a cross-section. A flange 20 corresponding to the hat-shaped flange is brought into contact with the outer panel 18.

On the upper surface of the inner panel 16, a pair of fastening holes 21A and 21B for being fastened to the bracket 14 are formed. The fastening holes 21A and 21B are formed in the front-rear direction with a bending and buckling starting point 24 of the outer panel 18 interposed therebetween. In FIG. 2, the fastening holes 21A and 21B are formed in front and rear with a bending and buckling starting point 24B interposed therebetween.

The outer panel 18 is an outer member in the width direction of the Fr side member 10, and by being joined with the inner panel 16, the Fr side member 10 has a closed cross-sectional structure. Abutting portions 19 are provided at both upper and lower ends of the outer panel 18, and the abutting portion 19 and the flange 20 of the inner panel 16 are joined by welding or the like.

On the outer panel 18, beads 22 are formed intermittently along the longitudinal direction (FR direction). The beads 22 are provided to improve the surface pressure rigidity of the outer panel 18, and in FIG. 2, the beads 22 are embossed outward in the vehicle width direction. The surface pressure rigidity of the portion in which the beads are not formed between the adjacent beads 22 and 22 becomes relatively low, and this portion is the bending and buckling starting point 24.

Since the bending and buckling starting point 24 is formed on the outer panel 18 which is the side surface portion of the Fr side member 10, the bending and buckling of the Fr side member 10 at the time of the front collision occurs mainly in the vehicle width direction.

In FIG. 2, the bending and buckling starting point 24 is taken as the break of the beads 22 and 22, but the invention is not limited to this form. For example, a break of reinforcement (reinforcement member), a portion having a relatively thin plate thickness, or a portion in which a broken shape or depression is previously formed in a plan view may also be the bending and buckling starting point 24.

Figure 3:
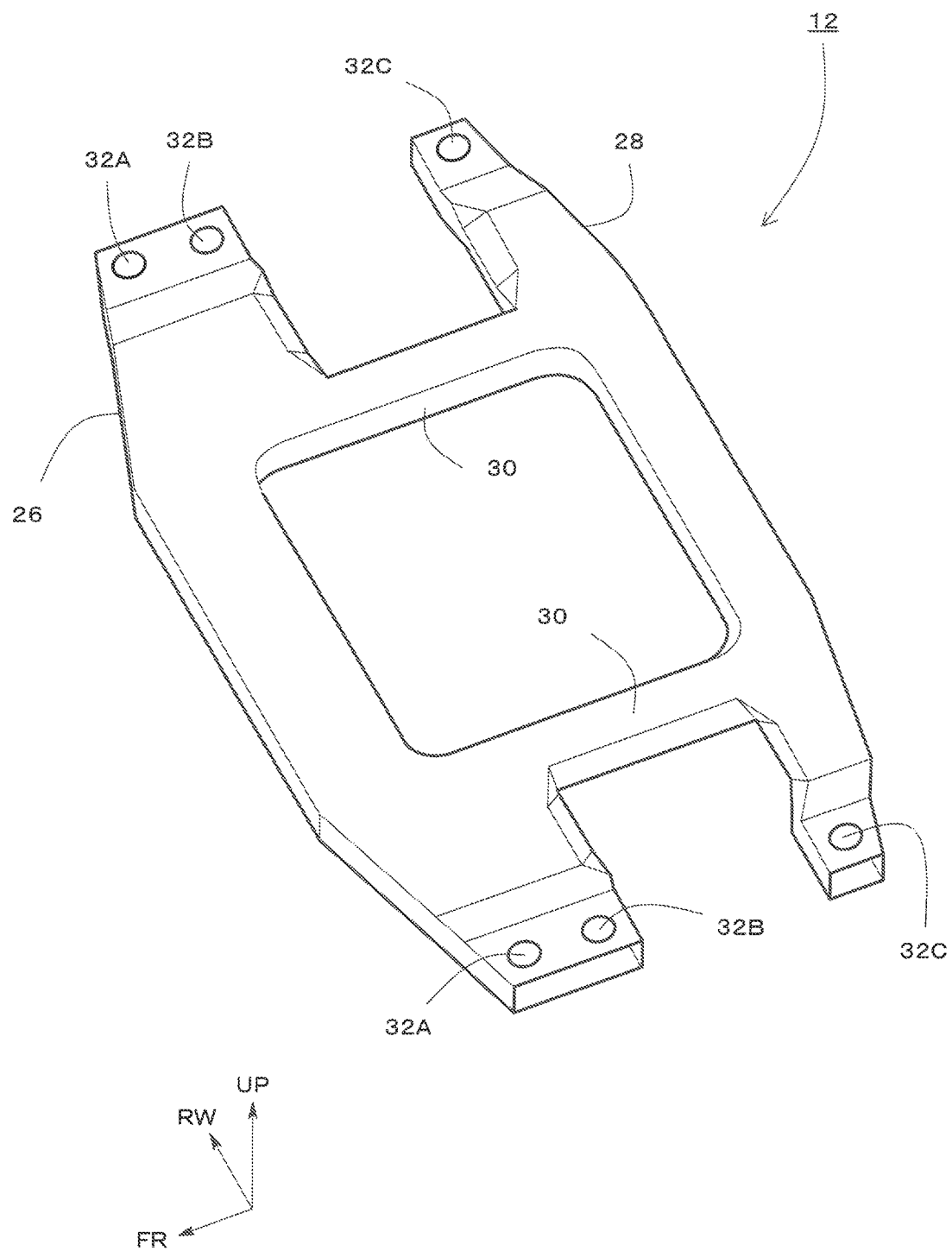
FIG. 3 is a perspective view illustrating an MGCpm cross member.

In FIG. 3, the MGCpm cross member 12 is illustrated. The MGCpm cross member 12 is provided between the pair of Fr side members 10, 10 and is a support frame arranged along the vehicle width direction. The MGCpm cross member 12 is a support frame of substantially a lattice shape, and is configured to include a front arm 26 and a rear arm 28 extending in the width direction, and a connecting arm 30 which connects the front arm 26 and the rear arm 28 and extends in the front-rear direction.

The MGCpm cross member 12 is equipped with a rotary electric machine which is a driving source of the vehicle. In addition, the MGCpm cross member 12 is also equipped with a power control unit (PCU) such as a DC/DC converter or an inverter provided between the power systems connecting the battery and the rotary electric machine to perform the power conversion. Further, the MGCpm cross member 12 is also equipped with auxiliary devices such as heaters and charging units. For example, the rotary electric machine is fastened to the lower surface of the MGCpm cross member 12, and the power control unit is fastened to the upper surface of the MGCpm cross member 12. As described above, the MGCpm cross member 12 is fixed to the Fr side members 10, 10 in a state in which the high voltage device is attached to the MGCpm cross member 12.

The MGCpm cross member 12 has, for example, a hollow structure. For example, by joining the upper member and the lower member by welding or the like, the MGCpm cross member 12 is formed.

Fastening holes 32A to 32C are formed at both ends in the width direction of the front arm 26 and the rear arm 28. As described later, the fastening holes 32A and 32B of the front arm 26 are aligned with fastening holes 38B and 38E of a front fastening portion 34 (see FIG. 4) of the bracket 14, and the fastening holes 32C of the rear arm 28 are aligned with fastening holes 38D of a rear fastening portion 36 of the bracket 14.

The connecting arm 30 is provided so as to be spaced inward in the width direction from both ends in the width direction of the front arm 26 and the rear arm 28. As described above, since the connecting arm 30 is disposed inward in the width direction from the Fr side member 10 and the bracket 14, a space can be formed inside the Fr side member 10 in the width direction (the end portion in the width direction is an open end). As will be described later, when the Fr side member 10 is subjected to the bending and buckling deformation accompanying the front collision, the Fr side member 10 can enter the space, and interference of the Fr side member 10 to the bending and buckling deformation is suppressed.

Figure 4:
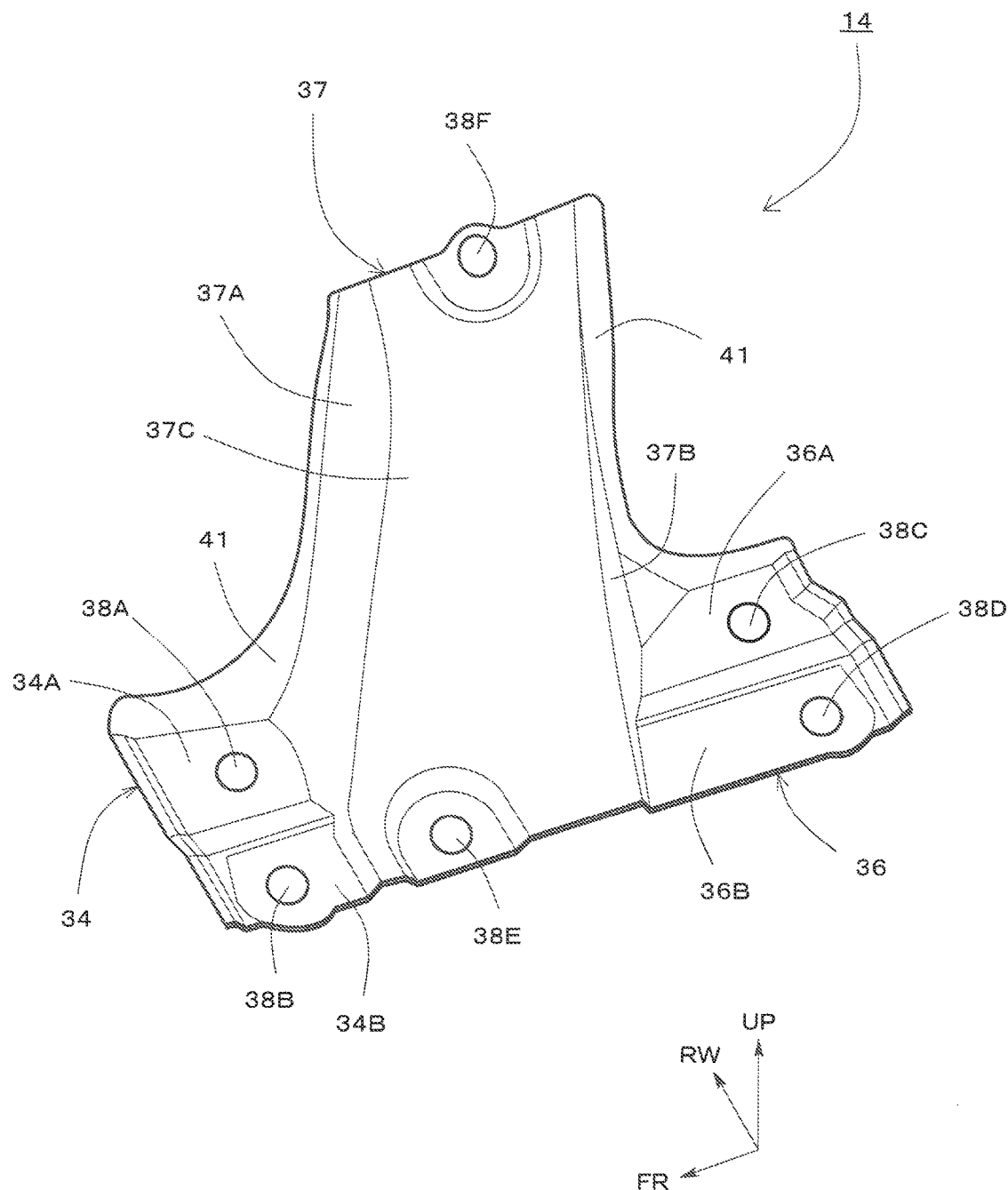
FIG. 4 is a perspective view illustrating a bracket.

The bracket 14 is illustrated in FIG. 4. The bracket 14 is fastened to the Fr side member 10 and the MGCpm cross member 12. That is, the MGCpm cross member 12 is fixed to the Fr side member 10 via the bracket 14. As will be described in detail below, the shape of the bracket 14 is determined so that the rigidity with respect to the load in the up-down direction is relatively high and the rigidity with respect to the load in the front-rear direction is relatively low. Due to the former characteristic, the support of the MGCpm cross member 12 in the up-down direction is reliably provided. Due to the latter characteristic, interference of the Fr side member 10 to the bending and buckling deformation at the time of the front collision is suppressed. The bracket 14 is also attached to the Fr side member 10 on the left side of the vehicle (not illustrated), but its description will not be provided below, in view of the symmetry of the vehicle structure.

The bracket 14 includes the front fastening portion 34, the rear fastening portion 36 (a pair of fastening portions), and a connecting portion 37. The front fastening portion 34 and the rear fastening portion 36 have a substantially flat plate shape, and include outer portions 34A and 36A that come into contact with the upper surface of the Fr side member 10, and inner portions 34B and 36B that protrude inward in the width direction from the outer portions 34A and 36A. The protruding inner portions 34B and 36B are brought into contact with the upper surface of the MGCpm cross member 12. Fastening holes 38A and 38B are formed in the outer portion 34A and the inner portion 34B of the front fastening portion 34, respectively. Similarly, fastening holes 38C and 38D are formed in the outer portion 36A and the inner portion 36B of the rear fastening portion 36, respectively.

The connecting portion 37 connects the front fastening portion 34 and the rear fastening portion 36. The connecting portion 37 is a bead extending in the up-down direction, and includes a front wall portion 37A, a rear wall portion 37B, and a side wall portion 37C.

The wall surface of the front wall portion 37A faces substantially perpendicularly to the front-rear direction of the vehicle (provided along the width direction), is connected to the rear end portion of the front fastening portion 34, and extends in the height direction. The wall surface of the rear wall portion 37B also faces substantially perpendicular to the front-rear direction of the vehicle, is connected to the front end portion of the rear fastening portion 36, and extends in the height direction. The wall surface of the side wall portion 37C is disposed along the front-rear direction of the vehicle, and connects the front wall portion 37A and the rear wall portion 37B.

Figure 8:
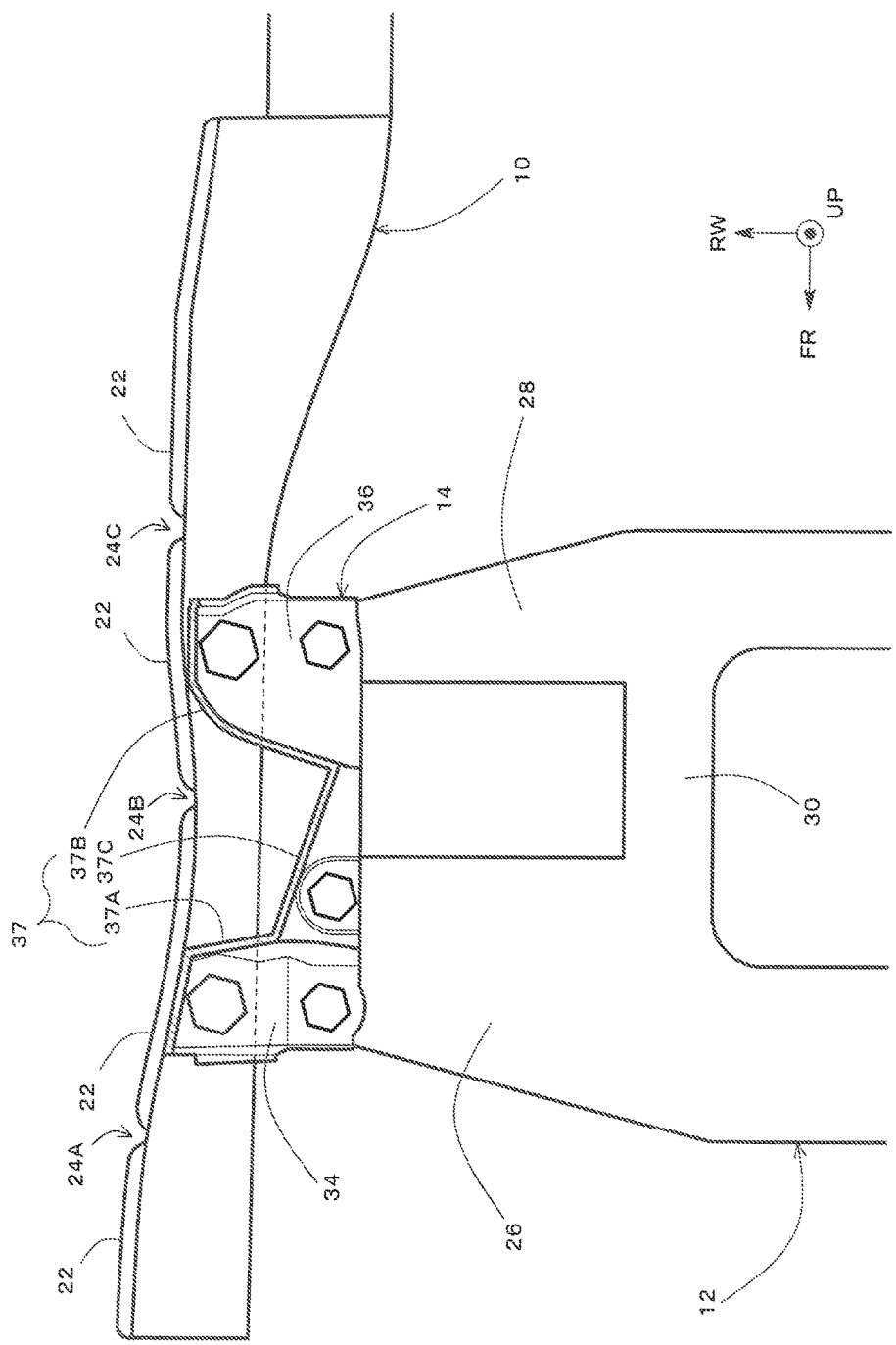
FIG. 8 is a cross-sectional plan view taken along a broken line of FIG. 6.

By the front wall portion 37A and the rear wall portion 37B perpendicular to the front-rear direction of the vehicle, and the side wall portion 37C connecting the two of them and extending parallel to the front-rear direction of the vehicle, the connecting portion 37 is formed in an angular groove shape (U shape) that is recessed in the vehicle width direction in a cross-section in a plan view, as illustrated in FIG. 8 which will be described later. As will be described later, the angular groove shape bends and deforms (following) with the bending and buckling of the Fr side member 10 at the time of the front collision.

In addition, the fastening hole 38E is formed in the lower end portion of the connecting portion 37, and a fastening hole 38F is formed in the upper end portion. As will be described later, the fastening hole 38E of the lower end portion is used for fastening with the MGCpm cross member 12, and the fastening hole 38F of the upper end portion is used for fastening with the fender apron 13.

An abutting region of the connecting portion 37 with the fender apron 13 has a shape conforming to the inner wall surface of the fender apron 13. That is, the connecting portion 37 covers the fender apron 13. As a result, a closed cross-section structure is formed as will be described later.

Figure 5:
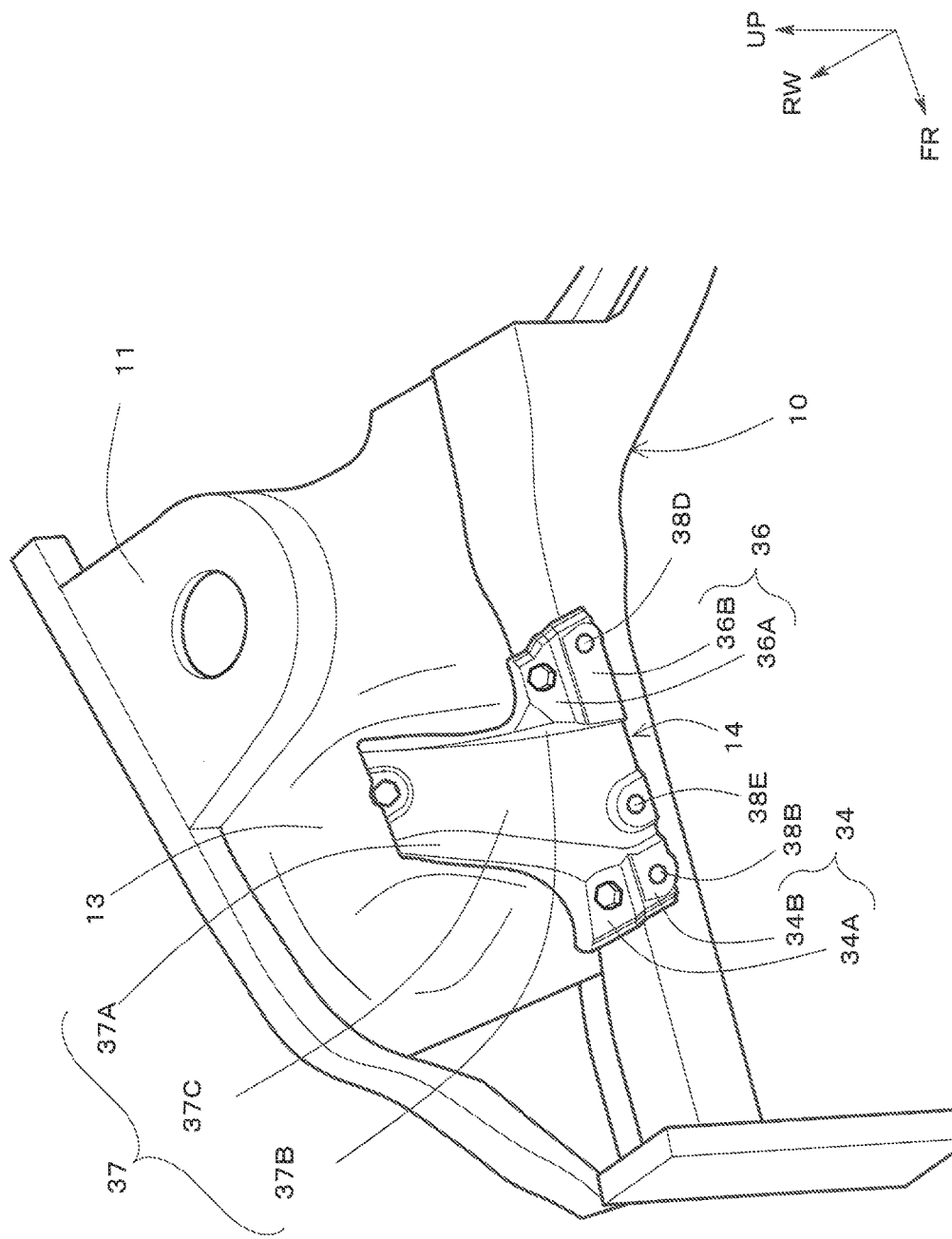
FIG. 5 is a perspective view illustrating a state in which the bracket is attached to a vehicle body.

FIGS. 5 to 8 illustrate an assembling process of the vehicle front structure according to the embodiment. As illustrated in FIG. 5, the bracket 14 is mounted on the upper surface of the Fr side member 10. Specifically, the fastening hole 38A provided on the front fastening portion 34 of the bracket 14 and the fastening hole 21A formed on the upper surface of the Fr side member 10 are aligned, and the screw fastening is performed by bolts and nuts. Similarly, the fastening hole 38C provided on the rear fastening portion 36 of the bracket 14 and the fastening hole 21B formed on the upper surface of the Fr side member 10 are aligned, and the screw fastening is performed by bolts and nuts.

As described above, the fastening holes 21A and 21B of the Fr side member 10 are provided at the front and rear across the bending and buckling starting point 24. Since the front fastening portion 34 and the rear fastening portion 36 are aligned with the fastening holes 21A and 21B and fastened by screws, the front fastening portion 34 and the rear fastening portion 36 are provided at the front and rear across the bending and buckling starting point 24.

Further, the fastening hole 38F provided at the upper end of the connecting portion 37 of the bracket 14, and a fastening hole 39 (see FIGS. 1 and 7) provided in the fender apron 13 are aligned and screwed by bolts and nuts. Further, flanges 41 (see FIG. 4) formed on both sides of the connecting portion 37 are joined to the fender apron 13 by welding, an adhesive, or the like.

A closed section structure having a rectangular shape in a cross-section in a plan view is formed by the connecting portion 37 (the front wall portion 37A, the rear wall portion 37B, and the side wall portion 37C) having an angular groove shape in a cross-sectional view and the fender apron 13. Since the bracket for supporting the MGCpm cross member 12 in the up-down direction has a closed cross-sectional structure extending in the up-down direction, high vertical support rigidity with respect to the MGCpm cross member 12 can be obtained.

In addition, a closed cross-sectional structure of the connecting portion 37 and the fender apron 13 is formed to be adjacent to the suspension tower 11. Since the suspension tower 11 supports the suspension, the support rigidity in the up-down direction, in the front-rear direction, and the left-right direction is higher than that of the other members. Since the closed cross-sectional structure of the connecting portion 37 and the fender apron 13 is formed to be adjacent to the suspension tower 11 having high vertical rigidity, vertical displacement of the closed cross-sectional structure is suppressed, and as a result, high vertical support rigidity with respect to the MGCpm cross member 12 can be obtained.

Figure 6:
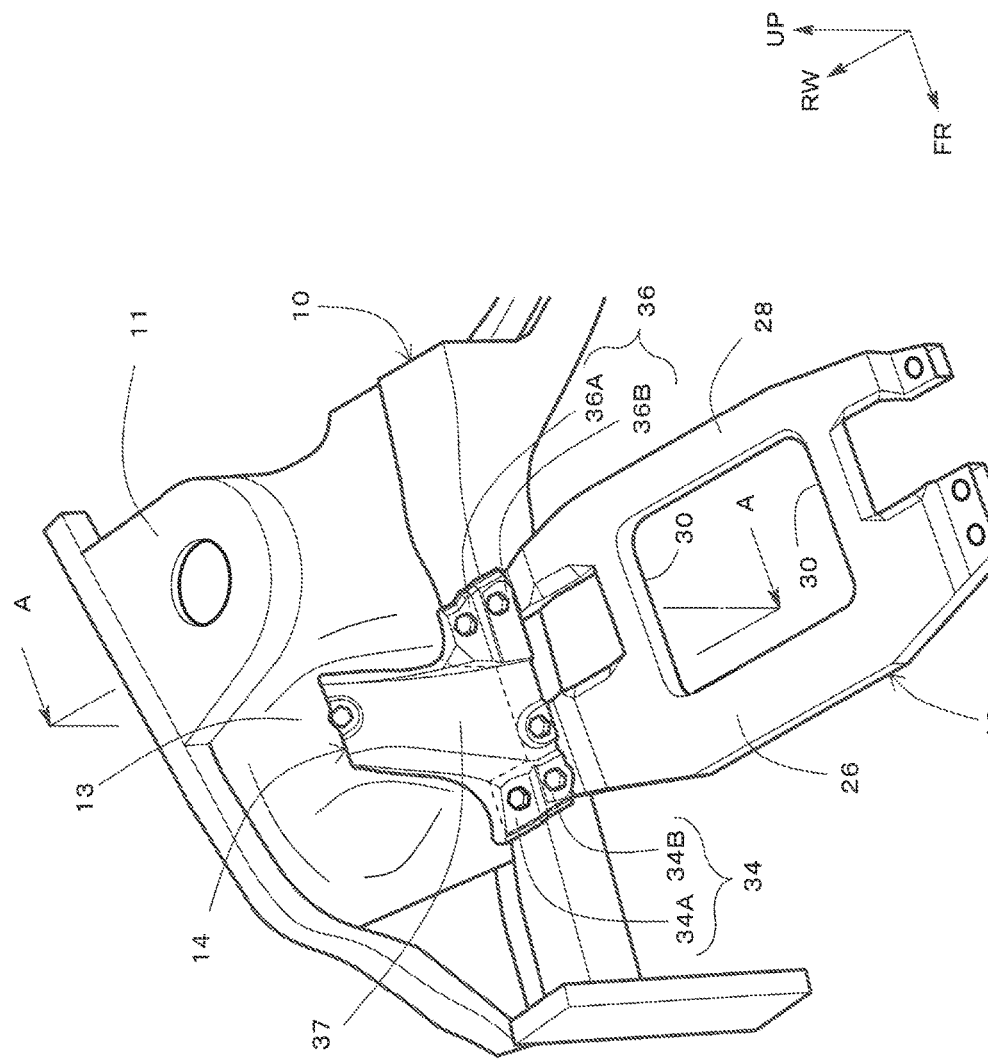
FIG. 6 is a perspective view illustrating a state in which the bracket and the MGCpm cross member are attached to a vehicle body.

FIG. 6 illustrates an example when the MGCpm cross member 12 is fastened to the bracket 14. The upper surface of the MGCpm cross member 12 is brought into contact with the inner portions 34B and 36B of the bracket 14 which protrude (extend) from the upper surface of the Fr side member 10. For example, the vehicle body including the bracket 14 and the Fr side member 10 is lifted, and on the other hand, the MGCpm cross member 12, to which the high voltage device such as a rotary electric machine is attached, is pushed up from below by a pedestal or the like. The fastening holes 32A and 32B (see FIG. 3) of the front arm 26 of the MGCpm cross member 12 are aligned with the fastening holes 38B and 38E (see FIG. 4) of the bracket 14, and the screw fastening is performed by bolts and nuts. Similarly, the fastening hole 32C of the rear arm 28 of the MGCpm cross member 12 is aligned with the fastening hole 38D of the bracket 14, and the screw fastening is performed by bolts and nuts. As a result, the MGCpm cross member 12 is fixed to the Fr side member 10 via the bracket 14.

Figure 7:
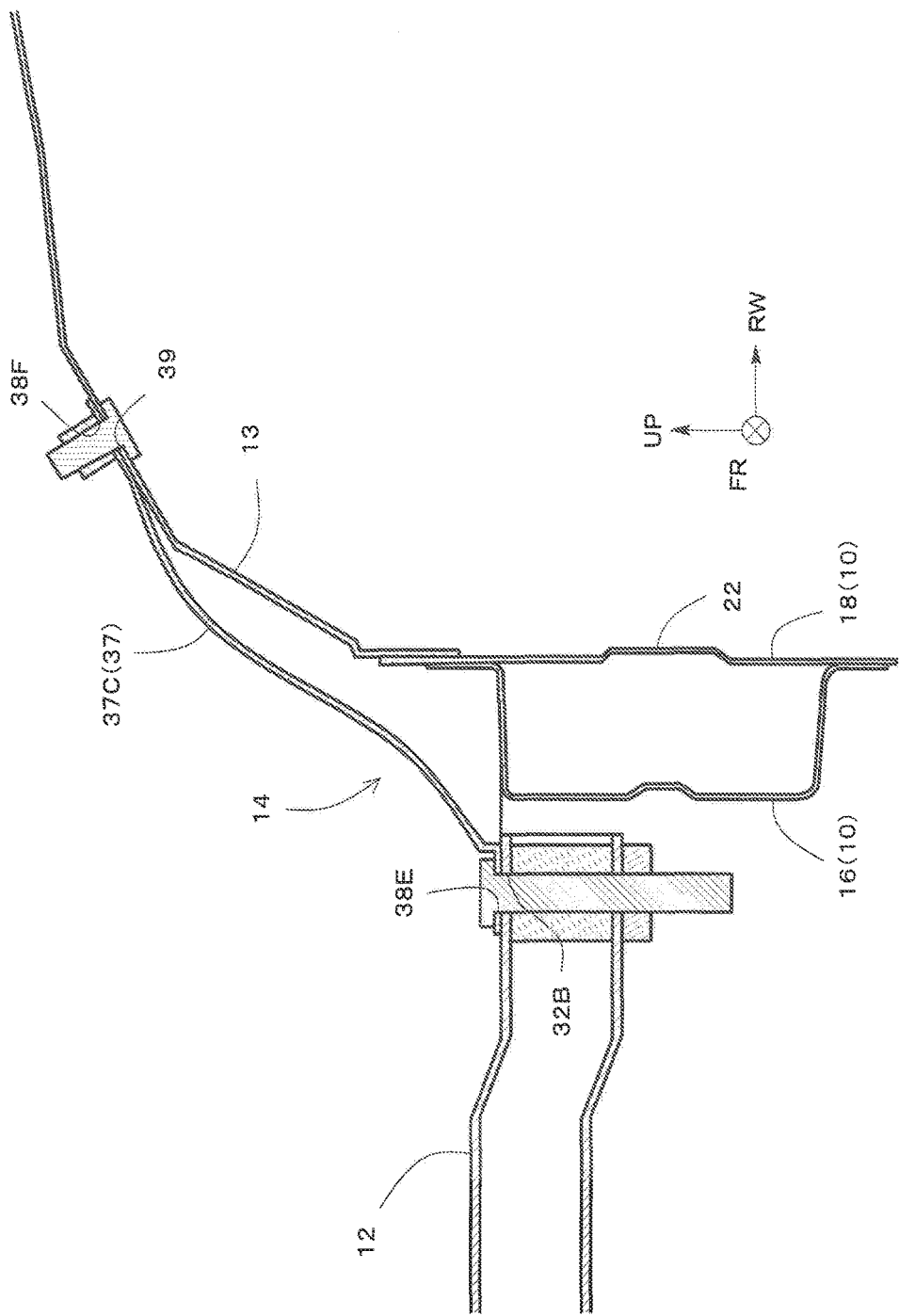
FIG. 7 is a cross-sectional front view illustrating cross-section A-A of FIG. 6.

FIG. 7 illustrates a cross-section along the line A-A of FIG. 6. As illustrated in FIG. 7, the MGCpm cross member 12 is supported in the up-down direction, in particular, by the connecting portion 37 of the bracket 14.

Further, FIG. 8 is a cross-sectional view taken along a broken line attached to the periphery of the bracket 14 of FIG. 6 in a plan view. Further, the fender apron 13 is not illustrated. As illustrated in FIG. 8, the connecting portion 37 of the bracket 14 is formed in an angular groove shape (U shape) recessed in the vehicle width direction, and is bent and deformed with respect to a load input in the front-rear direction of the vehicle.

Figure 9:
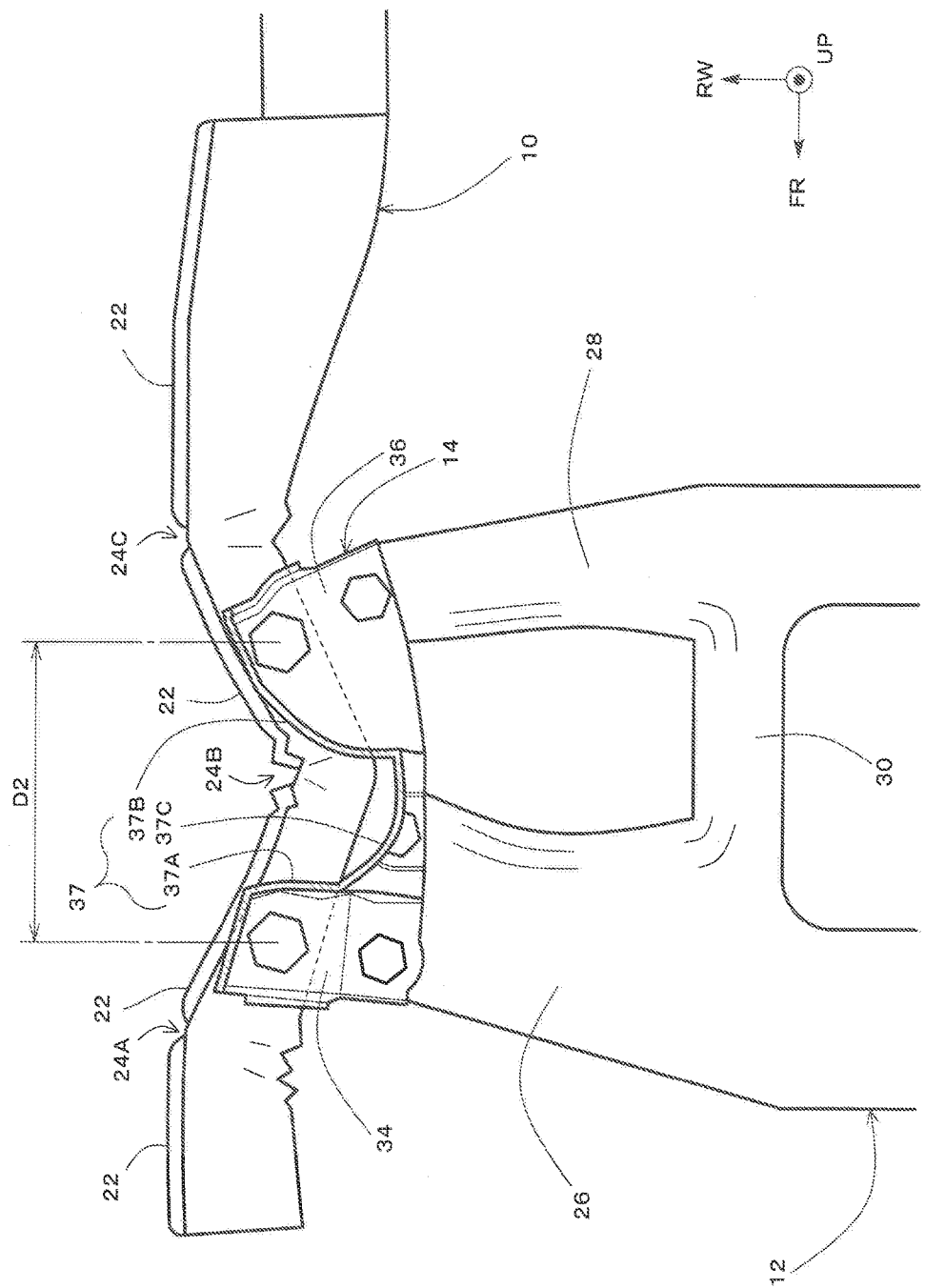
FIG. 9 is a diagram illustrating a deformed state of respective members at the time of a front collision.
Figure 10:
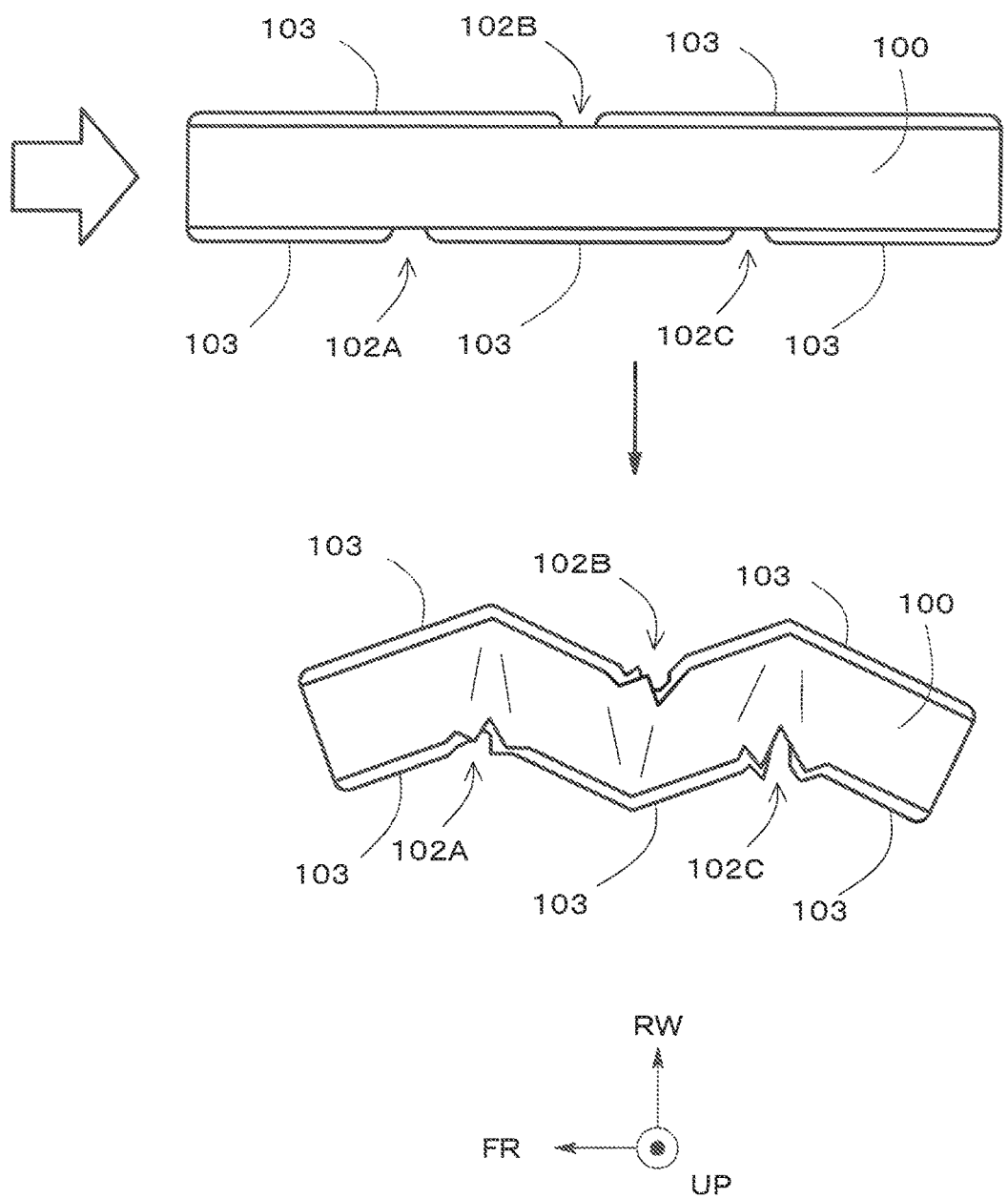
FIG. 10 is a diagram illustrating bending and buckling of an Fr cross member.
Figure 11:
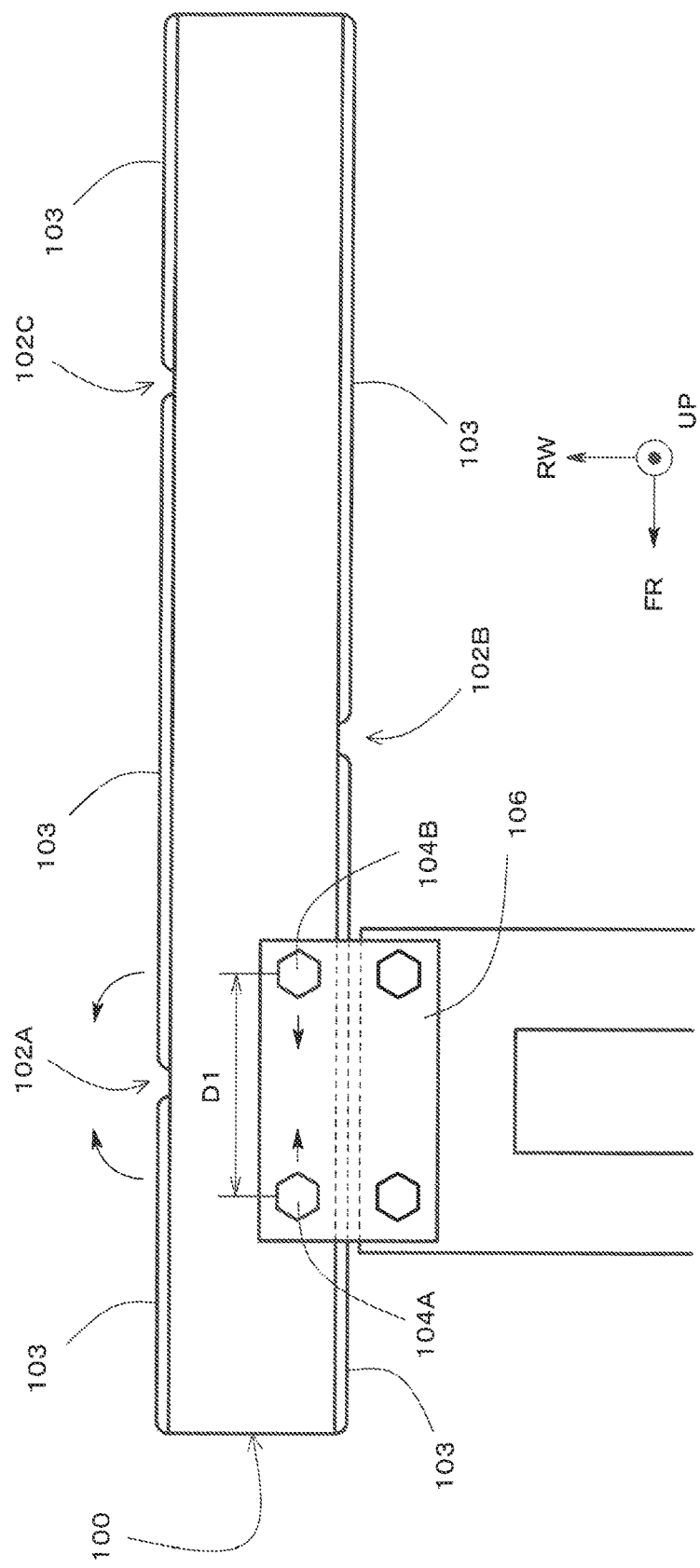
FIG. 11 is a view illustrating a conventional example of attaching the bracket to the Fr cross member.

FIG. 9 is a cross-sectional view taken along the vehicle front structure at the time of the front collision in a plan view. With the front collision, the Fr side member 10 is subjected to bending and buckling deformation. As described above, the bending and buckling occurs with bending and buckling points 24A to 24C as fulcrum points of fracture. Along with the bending and buckling, an interval D2 between the front fastening portion 34 and the rear fastening portion 36 of the bracket 14 bolted to the Fr side member 10 changes. In the example of FIG. 9, the interval D2 shrinks. Along with the change in the interval, a load in the front-rear direction of the vehicle is input to the bracket 14. In the example of FIG. 9, the compression load in the front-rear direction of the vehicle is input to the bracket 14 as the interval D2 decreases.

At this time, the front wall portion 37A and the rear wall portion 37B extending in the vehicle width direction are bent and deformed. For example, the front wall portion 37A and the rear wall portion 37B are deflected in an arc shape. Further, with the deflection in the arc shape, the side wall portion 37C is bent and deformed (flexurally deformed) so as to bulge inward in the vehicle width direction. In this way, since the connecting portion 37 is bent and deformed against the load in the front-rear direction of the vehicle which is input to the bracket 14, the Fr side member 10 can be bent and buckled, and the impact at the time of the front collision is absorbed by bending and buckling.

As described above, since a space is formed between the front arm 26 and the rear arm 28 of the MGCpm cross member 12, the Fr side members 10 that are bent and buckled can enter the space. In this way, by adopting such a configuration in which the bracket 14 and the MGCpm cross member 12 do not inhibit the bending and buckling of the Fr side member 10, the impact at the time of the front collision can be absorbed (the bending and buckling of) by the Fr side member 10.

It is to be noted that the invention is not limited to the above-described embodiments but includes all changes and modifications without departing from the technical scope or essence of the invention as defined by the claims.

The invention claimed is:

1. A vehicle front structure comprising:
a pair of Fr side members extending in a front-rear direction of the vehicle;
a support frame provided between the pair of Fr side members and equipped with a rotary electric machine as a driving source; and
a bracket which fixes the support frame to the pair of Fr side members,
wherein a bending and buckling starting point in a vehicle width direction is formed in the Fr side member,
the bracket is provided with a fastening portion which comes into contact with an upper surface of the Fr side member, protrudes inward in the vehicle width direction from the upper surface of the Fr side member, and comes into contact with the upper surface of the support frame so as to be disposed in a pair in a front-rear direction across a buckling starting point of the Fr side member,
the bracket includes a connecting portion having an angular groove shape recessed in the vehicle width direction in a cross-section in a plan view, the connecting portion including a front wall portion connected to a front fastening portion among the pair of fastening portions and extending in a height direction, a rear wall portion connected to a rear fastening portion among the pair of fastening portions and extending in the height direction, and a side wall portion which connects the front wall portion and the rear wall portion.

2. The vehicle front structure according to claim 1, wherein the connecting portion extends in the height direction along a shape of an inner wall surface of a fender apron and a closed cross-section structure is formed with by the fender apron, the front wall portion, the side wall portion, and the rear wall portion.

3. The vehicle front structure according to claim 1, wherein the support frame includes
a front arm fastened to a front fastening portion among the pair of fastening portions,
a rear arm fastened to a rear fastening portion among the pair of fastening portions, and
a connecting arm which connects the front arm and the rear arm,
wherein the connecting arm is provided so as to be spaced apart inward in the vehicle width direction from the bracket.

4. The vehicle front structure according to claim 2, wherein the support frame includes
a front arm fastened to a front fastening portion among the pair of fastening portions,
a rear arm fastened to a rear fastening portion among the pair of fastening portions, and
a connecting arm which connects the front arm and the rear arm,
wherein the connecting arm is provided so as to be spaced apart inward in the vehicle width direction from the bracket.

5. A vehicle bracket in which a support frame provided between a pair of Fr side members and equipped with a rotary electrical machine serving as a driving source is fixed to the pair of Fr side members extending in a front-rear direction of the vehicle, a bending and buckling starting point in a vehicle width direction being formed in the Fr side member, the vehicle bracket comprising:
a fastening portion which is brought into contact with an upper surface of the Fr side member, protrudes inward in the vehicle width direction from the upper surface of the Fr side member, comes into contact with the upper surface of the support frame, and is disposed in a pair in a front-rear direction across the bending and buckling starting point of the Fr side member; and
a connecting portion having an angular groove shape recessed in the vehicle width direction in a cross-section in a plan view which includes a front wall portion connected to a front fastening portion among the pair of fastening portions and extending in a height direction, a rear wall portion connected to a rear fastening portion among the pair of fastening portions and extending in the height direction, and a side wall portion which connects the front wall portion and the rear wall portion.

* * * * *